(12) United States Patent
Takahashi (10) Patent No.: US 8,370,954 B2
(45) Date of Patent: Feb. 5, 2013

(54) CONTENT MANAGEMENT SYSTEMS AND METHODS INCLUDING CONTENT USAGE RESTRICTIONS

(75) Inventor: Takeshi Takahashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 778 days.

(21) Appl. No.: 11/754,399

(22) Filed: May 29, 2007

(65) Prior Publication Data

US 2008/0022373 A1 Jan. 24, 2008

(30) Foreign Application Priority Data

Jul. 18, 2006 (JP) .................................. 2006-196276

(51) Int. Cl.
*G06F 7/04* (2006.01)
*G06F 17/30* (2006.01)
*G06F 12/14* (2006.01)
*G06F 15/16* (2006.01)
*G06F 15/173* (2006.01)
*H04L 29/06* (2006.01)

(52) U.S. Cl. .............. 726/27; 726/4; 713/153; 713/161; 713/165; 713/189; 709/219; 709/225

(58) Field of Classification Search ................... 726/27, 726/4; 713/153, 161, 165, 189; 709/219, 709/225
See application file for complete search history.

(56) References Cited

U.S. PATENT DOCUMENTS

| | | | | |
|---|---|---|---|---|
| 6,301,618 B1 * | 10/2001 | Sitaraman et al. | ............ | 709/227 |
| 7,359,517 B1 * | 4/2008 | Rowe | ............ | 380/284 |
| 7,523,303 B2 * | 4/2009 | Nakae | ............ | 713/156 |
| 2004/0044891 A1 * | 3/2004 | Hanzlik et al. | ............ | 713/150 |
| 2006/0259513 A1 * | 11/2006 | Crucs | ............ | 707/104.1 |
| 2007/0168294 A1 * | 7/2007 | Tsurukawa | ............ | 705/59 |

FOREIGN PATENT DOCUMENTS

| | | |
|---|---|---|
| JP | 2003-099670 A | 4/2003 |
| JP | 2003-345660 A | 12/2003 |

* cited by examiner

*Primary Examiner* — Aravind Moorthy
(74) *Attorney, Agent, or Firm* — Rossi, Kimms & McDowell LLP (57) ABSTRACT

Key data is generated that contains a decryption key that decrypts an encrypted content, and a policy that defines the usage restrictions on the content. Binder data is then generated, which contains the encrypted content, key data, and the control data, which describes the applied conditions of the key data.

3 Claims, 9 Drawing Sheets

FIG. 2A

| PID | PolicyName |
|---|---|
| 1 | Policy1 |
| 2 | Policy2 |
| 3 | Policy3 |

FIG. 2B

| DocumentID | PID | Key |
|---|---|---|
| 1 | 1 | ****** |
| 2 | 1 | ****** |
| 3 | 2 | ****** |
| 4 | 1 | ****** |
| 5 | 2 | ****** |

FIG. 2C

| UID | UserName | Password |
|---|---|---|
| 1 | User1 | *** |
| 2 | User2 | *** |
| 3 | User3 | *** |

FIG. 2D

| PID | UID | Authorization |
|---|---|---|
| 1 | 1 | Write |
| 1 | 2 | Read |
| 2 | 1 | Write |
| 2 | 2 | Write |
| 3 | 1 | Write |

CONTENT MANAGEMENT SYSTEMS AND METHODS INCLUDING CONTENT USAGE RESTRICTIONS

BACKGROUND OF THE INVENTION

1. Field of the Invention

The invention relates to a technology that that shares a content that is stored on a system among a plurality of users.

2. Description of the Related Art

A document management system is a known technology that involves connecting a device that is capable of reading document data, a server that manages the document data, and a PC or other client that uses the document data reading device and the server, via a network. In a case that a plurality of users are sharing the document data on such a document management system, there is also a method of setting an access authorization for each respective document data or folder, and granting an editing authorization for the document data only to a specified user. A server, which defines and manages a usage authorization of the document data, is known as a policy management server, which performs management of the distributed document in accordance with a policy, and assigns the policy that is issued via the server to the document. It is thus possible to offer a policy management system that controls access authorization to the document data, even after the document data has been distributed by the system.

Japanese Patent Laid Open No. 2003-099670 offers a system that contains a movable object for promotional display use, comprising a display unit adapted to displaying a received content, and a server that provides a digital content to the movable object. Consequently, the movable object sends information of a current position to the server, which adjudicates the information upon receipt, and selects and distributes the appropriate content.

According to Japanese Patent Laid Open No. 2003-345660, the content is distributed with information attached that contains a usage condition of the content to an index file of the content. A receiving device checks the information that denotes the attached usage condition when querying the index data. A system that facilitates a usage of the content in accordance with the usage condition is thus disclosed.

Typically, the system that assigns the policy that is issued via the policy management server to the document data, and distributes the document data, can only set one active policy for one file. Accordingly, it has not been possible to switch the applicable policy in response to the condition, for example, switching the policy within an intranet environment and an Internet environment.

It has also not been possible to set more than a single usage condition for the content upon distribution in the index file of the content, even within a distribution system that contains the usage condition of the content. Accordingly, it has not been possible to execute an access control in response to each respective condition, for example, changing a behavior in response to such a condition as whether the environment is an intranet environment, or an Internet environment.

SUMMARY OF THE INVENTION

The objective of the present invention is to resolve the problems.

A feature of the present application is to provide a technology that allows control of access to the distributed content, and to apply and control a different policy for different conditions.

According to the present invention, there is provided a content management system for managing a content, comprising:

a policy definition unit configured to define a policy, which is information for specifying an operation authorization of a content;

an encryption unit configured to encrypt the content;

a key data creation unit configured to create key data, which contains a decryption key for decrypting the content encrypted by the encryption unit, and the policy defined by the policy definition unit; and a unit configured to generate binder data that contains the content encrypted by the encryption unit, the key data created by the key data creation unit, and control data for describing an applied condition of the key data.

According to the present invention, there is provided a content management apparatus connected, over a network, to a content server for storing a content, and a policy management server for issuing a policy that is information for specifying an operation authorization of a content, comprising:

an acquisition unit configured to acquire a content stored on the content server, and the policy issued from the policy management server, that is attached to the content;

an encryption unit configured to acquire an encryption key from the content server and encrypt the content;

a key data creation unit configured to create key data, which contains a decryption key adapted to decrypting the content encrypted by the encryption unit, and the policy acquired by the acquisition unit; and a unit configured to generate binder data that contains the content encrypted by the encryption unit, the key data created by the key data creation unit, and control data for describing an applied condition of the key data.

The summary of the invention does not cite all features of the present application. It is possible for the invention to be achieved by a combination of other claims and features that are disclosed in the scope of the claims.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

First Embodiment

Figure 1:
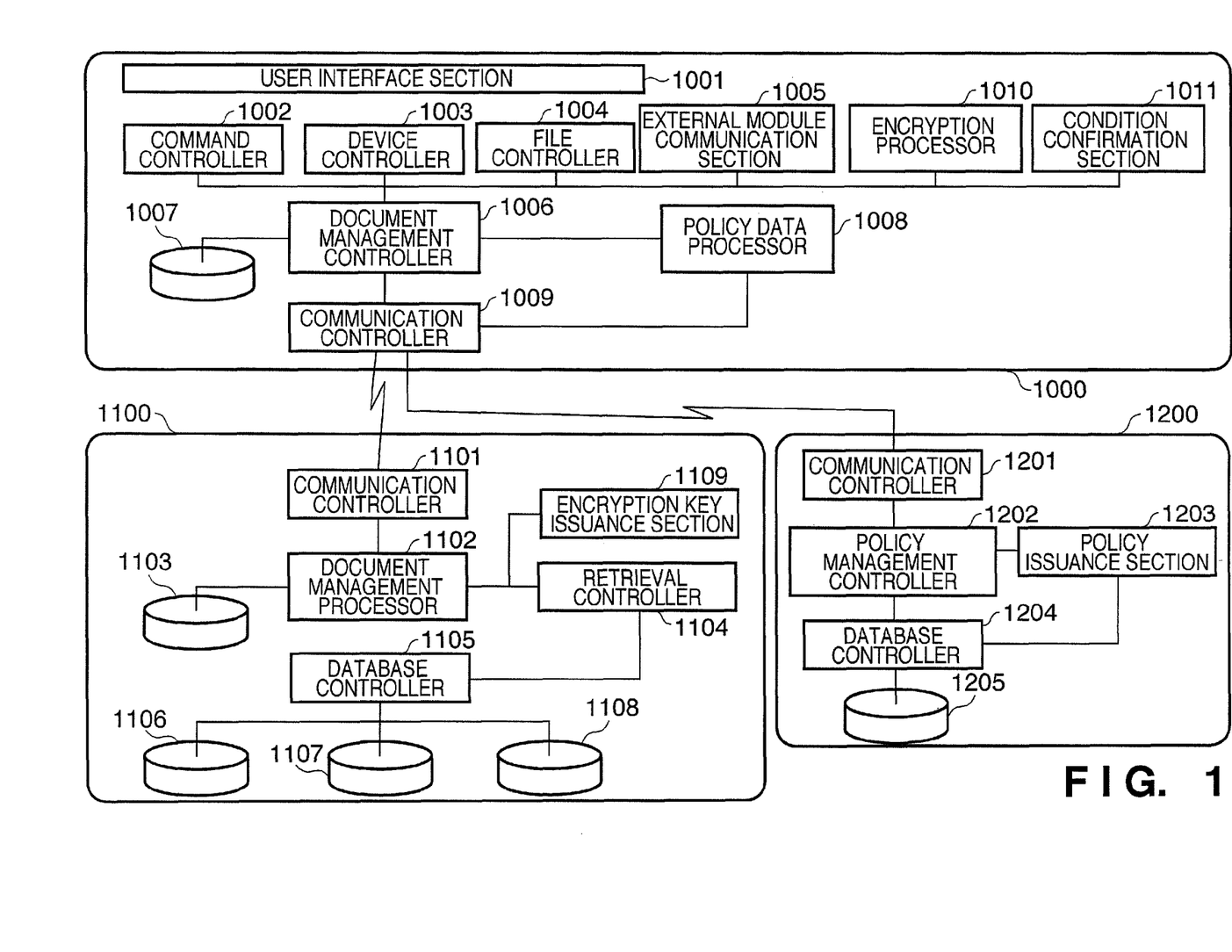
FIG. 1 is a block diagram depicting a software configuration of a document management system according to a first embodiment of the present invention.

FIG. 1 is a block diagram depicting a document management system software configuration according to a first embodiment of the present invention.

The document management system possesses a client software 1000, which runs on a personal computer (PC) operating system (OS), and a document server software 1100, a content server that reads a document data, that is, a content file, either via a scanner or other device, or a file on the operating system, and manages the document data for a plurality of users. In addition to the document server software 1100, a policy management server 1200 is included, which is capable of managing and issuing a control data, known as a policy, which controls access to the distributed file. Reference numerals 1000, 1100, and 1200 in the preceding refer to the client, the document server, and the policy management server, respectively. The servers and clients that implement each respective software package are described hereinafter, with reference to FIG. 7.

Following is a description of a processing unit that performs input/output and manipulation of the document data.

A client 1000 user performs a manipulation on the document server 1100, via a user interface section 1001, which may comprise a document data entry, acquiring the document data from the document server 1100, or searching for the document data. Such manipulations as setting access authorization for a fixed keyword, as well as acquiring or displaying the document data for which the access authorization is set, according to the embodiment, are also performed herein. Information that is manipulated in the user interface section 1001 is interpreted in a command controller 1002, and the corresponding process is performed thereon. If necessary, a command is created to communicate with the document server 1100. The scanner or other device is controlled by a device controller 1003, which reads the document data from the device, or receives the data that is sent from the device. The document file that is saved on a file server or other operating system is inputted by a file controller 1004 in a format that imports the document data. A process of exporting the file that is managed in the document server 1100 to the operating system is also performed by the file controller 1004.

An external module communication section 1005 performs communication with an external application, passes the document data of the document server 1100 to the external application, and performs a process of receiving the document data from the external application. For example, a process of passing the document data of the document server 1100 to a Messaging Application Program Interface (MAPI) compliant mailer is performed herein.

Following is a description of each respective processing unit that is installed within the client 1000.

A document management controller 1006 is the heart of the client 1000. The processes performed herein correspond to the files and commands passed from the controllers 1002 through 1004. A temporary database 1007 stores temporary data, such as data created in the course of performing image processing or communicating with the servers 1100 or 1200. A policy data processor 1008 controls access to the folder or the document data, according to the policy data that is associated with the document data. The policy data processor 1008 performs a process of communicating the policy data that is assigned to the document data to the policy management server 1200, and verifying authorization to perform manipulation upon the document data. The policy data is described in detail hereinafter. Information such as an authorization list that denotes authorization to perform manipulation upon the file that is received from the policy management server 1200 is processed, and information such as the results of the policy verification is returned to the policy data processor 1008. A communication controller 1009 performs a control for communication with the document server 1100 or the policy management server 1200. The communication controller 1009 performs control only on specific processes of the document server 1100 or the policy management server 1200, using devices supplied by the operating system to control the actual communication of TCP/IP, for example.

The encryption processor 1010 performs encryption and decryption of the content file or a key file, to be described hereinafter. A condition confirmation section 1011 verifies a condition of the PC that is accessing the document data, and specifies the appropriate key file to be applied thereto, according to a condition that is recited in a control file, to be described hereinafter, which denotes a condition for the application of the policy.

Following is a description of each respective processor that is installed within the document server 1100.

A communication controller 1101 performs control of communication with the client 1000's communication controller 1009. The communication controller 1101, however, is capable of performing parallel communication with a plurality of client communication controllers. A document management processor 1102 controls a process on the document server 1100 in response to an instruction from the client 1000. A temporary database 1103 stores temporary data, such as data created in the course of communicating with the client 1000, or the document data that is converted according to a document conversion rule. A retrieval controller 1104 performs such processes as retrieving document data as requested via the client 1000, or generating an index for retrieval of the document data that is entered therein.

A database controller 1105 creates data that is stored in databases 1106 through 1108, to be described hereinafter, storing the document data that corresponds to the volume database 1106, the attribute database 1107, or the full-text retrieval database 1108. The database controller 1105 also performs a process of retrieving data from the respective databases, in response to a request from the client 1000, and creating the document data that is passed to the client 1000. The volume database 1106 stores an actual state of the document data. Given that the volume database 1106 is a conceptual database, having the actual state be the file system of the operating system does not pose a problem. The attribute database 1107 stores information relating to the attributes of the document data, such as name, date created, and comments. The attribute database 1107 also stores the management information data, such as information of the user who uses the document management system, as well as an access control table that maintains the access authorization that is linked to the keyword, and the document conversion rule corresponding to the access authorization. The full-text retrieval database 1108 extracts text data from the entered document data, and creates and enters the index information of the document data. When a full-text retrieval is performed via the client 1000, the full-text retrieval database 1108 is searched. An encryption key issuance section 1109 issues a key that encrypts and decrypts the content data.

Following is a description of each respective processor that is installed within the policy management server 1200.

A communication controller 1201 performs control of communication with the client 1000's communication controller 1009. The communication controller 1201 of the policy management server 1200, however, is capable of performing simultaneous communication with a plurality of client communication controllers. A policy management controller 1202 controls the processes of the policy management server 1200, in response to a request from the client 1000. A policy issuance section 1203 generates the policy data and requests that a database controller 1204 enter the policy in a policy management database 1205, according to the request from the client 1000 that the policy management controller 1202 has received. The database controller 1204 stores the policy that is issued by the policy issuance section 1203 in the policy management database 1205. The database controller 1204 also retrieves either the policy data, or authorization data, to be described hereinafter, in response to the request from the client 1000, from the policy management database 1205, and passes the retrieved data to the client 1000. The policy management database 1205 stores data necessary for policy management. Such data would include policy identification and property data, as well as data for identifying the document data to which the policy is affiliated, and which is controlled by the policy, and identification and authentication data of the user whose operations are regulated vis-à-vis the policy.

FIGS. 2A through 2D depict views illustrating examples of data structures of information relating to the policy that is entered into the policy management database 1205.

Figure 2A:
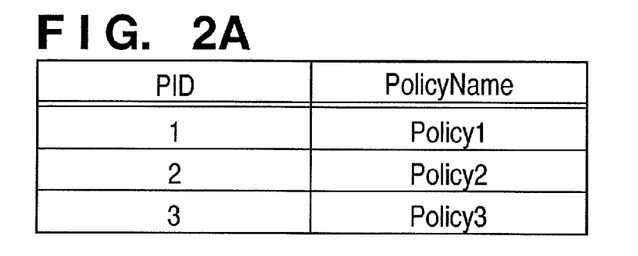
FIGS. 2A through 2D depict views illustrating examples of data structures of information relating to a policy that is entered into a policy management database according to the embodiment.
Figure 2B:
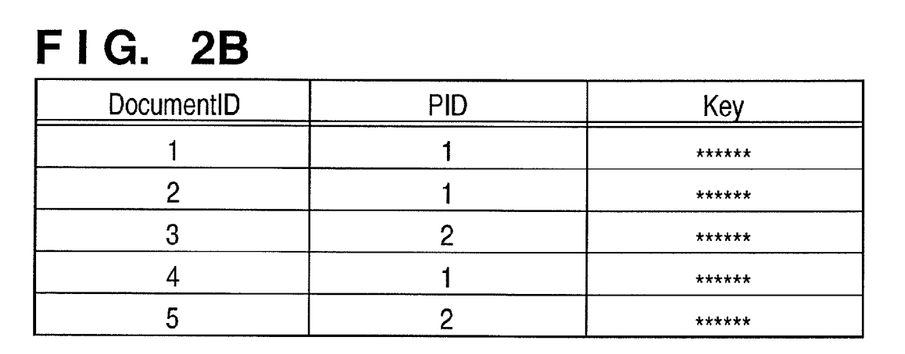
Figure 2C:
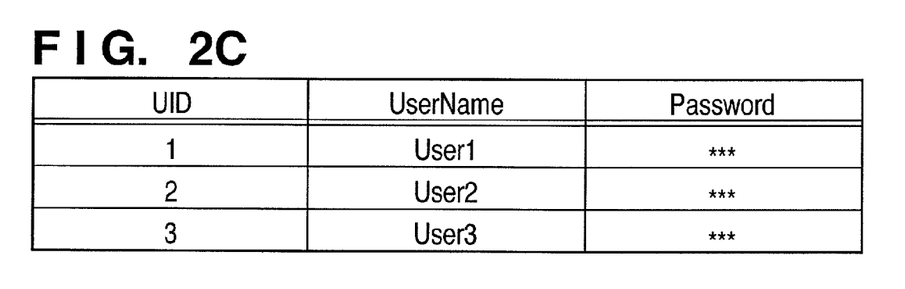
Figure 2D:
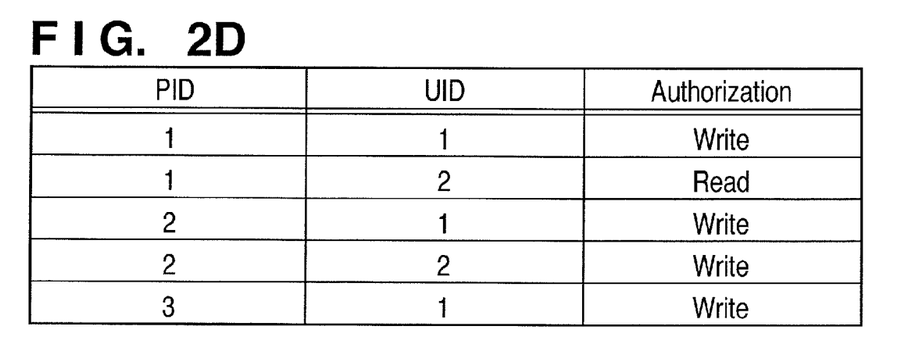

FIG. 2A depicts a data structure of a table that links a policy ID number (PID) with a policy name (PolicyName). FIG. 2B depicts a data structure of a table that manages a link between a document ID number (DocumentID) to which the policy is assigned, the PID of the policy thus assigned, and a key for decrypting document content that is encrypted when the policy is assigned thereto (Key). FIG. 2C depicts a data structure of a user information table that links and stores a user ID number (UID), a user name (UserName), and a password (Password) of user that is managed on the policy management server 1200. FIG. 2D depicts a data structure of a table that manages a definition of each respective policy, storing information that denotes authorization (authorization information) that is permitted to the UID and the associated user, corresponding to each respective PID (Authorization). While a single type of authorization is allowed to be set for each respective policy according to the embodiment, the present invention is not limited thereto, and it would be permissible, for example, to allow setting other authorizations, such as printing authorization.

As depicted in FIGS. 2A through 2D, it is possible to assign a PID to a group of authorizations for one or more users, and to specify a particular policy on a per user basis. Linking the DocumentID and the PID allows defining the authorization of a particular user for a particular document.

The document data to which the policy is assigned has a linked DocumentID, and is encrypted with the encryption key that corresponds to the decryption key, i.e., the Key in FIG. 2B, that in turn corresponds to the DocumentID. Accordingly, a configuration results wherein the document data to which the policy is assigned is itself encrypted, and the DocumentID and the information that specifies the policy management server 1200, such as the server's IP address, are attached thereto as attribute information.

Figure 3:
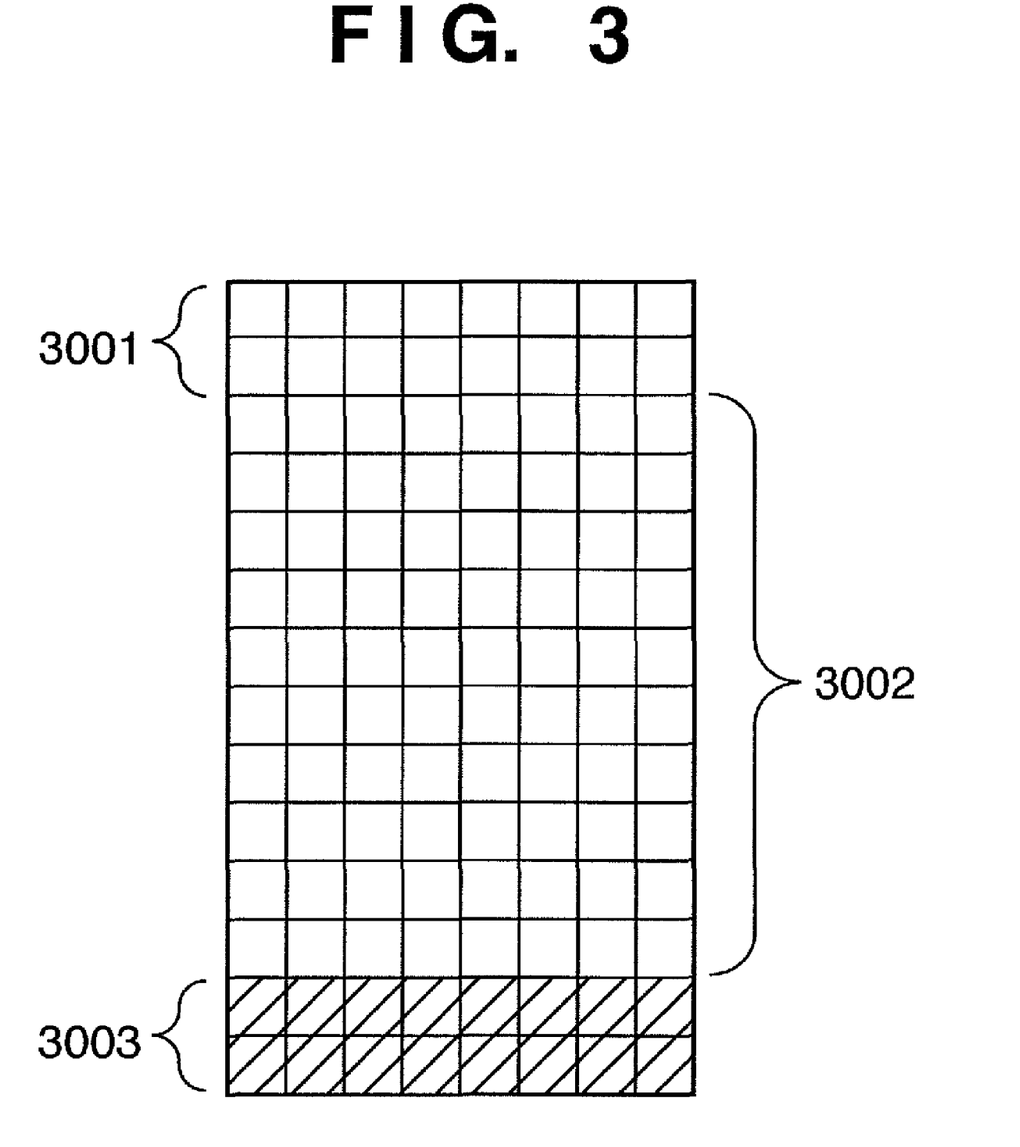
FIG. 3 depicts a concept diagram illustrating a data structure of a folder control file according to the embodiment.

FIG. 3 depicts a view illustrating a concept diagram depicting a data structure of a file to which a policy is attached, according to the embodiment. A key file X4009 and a key file Y4010 possess similar structures.

Reference numeral 3001 denotes a header, which stores the file type and metadata on the file proper. Reference numeral 3002 denotes file data corresponding to the main content area of the file that is encrypted when the policy is assigned. Reference numeral 3003 denotes policy data, which is necessary for performing policy verification on the policy management server 1200. The policy data section 3003 contains the policy identification data (PID), a document ID number that identifies a document on the policy management server 1200 (DocumentID), and the data that specifies the policy management server 1200, such as the server's IP address. As is apparent from the description of FIGS. 2A through 2D, it is possible for the policy management server 1200 to specify the PID, so long as the DocumentID, at least, is known. Accordingly, it is permissible for the policy data section 3003 to possess only one or the other of the DocumentID and the PID; it is not absolutely necessary for the policy data section 3003 to possess both.

Figure 4:
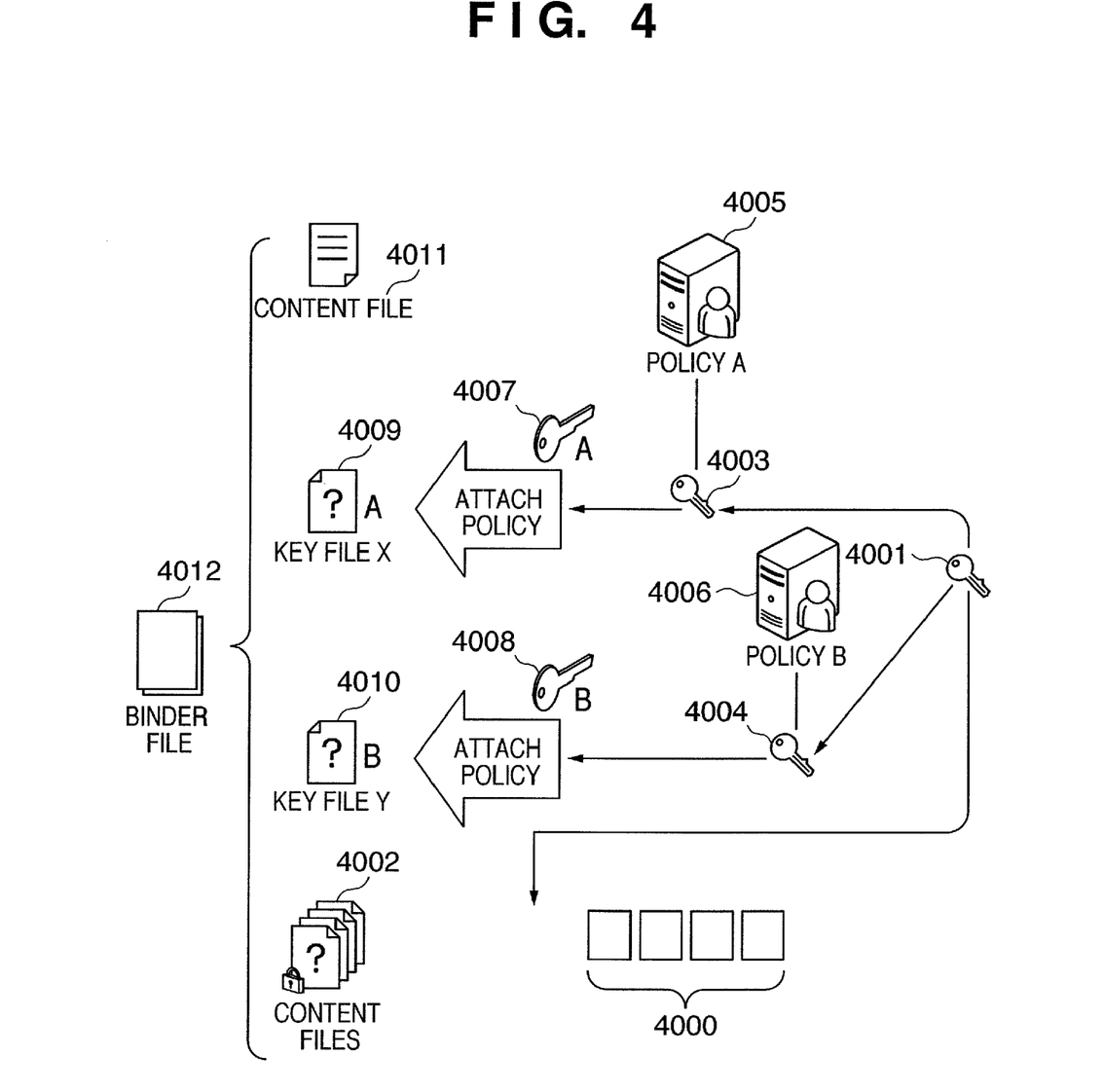
FIG. 4 depicts a concept diagram illustrating a data structure of a binder file that is distributed from a document server.

FIG. 4 depicts a view illustrating a concept diagram describing a process of generating a binder file that is distributed via the document server 1100, according to the embodiment.

Reference numeral 4000 denotes content files, which take a format that allows distributing even a plurality of files as a single file according to the embodiment. Reference number 4001 denotes an encryption key that encrypts and decrypts the content files 4000, and which is issued by the encryption key issuance section 1109 of the document server 1100. Reference numeral 4002 denotes content files that have been encrypted by the encryption key 4001. Reference numerals 4003 and 4004 denote files or data that store the keys that decrypt the content. Reference numerals 4005 and 4006 denote policy management servers that issue the policies, which have a configuration similar to the policy management server 1200 in FIG. 1. Reference numerals 4007 and 4008 denote the policies, issued by the policy management servers 4005 and 4006, which are assigned to the files or data 4003 and 4004 that store the decryption keys. Key files 4009 and 4010 respectively denote files to which the policy for either the file 4003 or 4004 that stores the decryption keys is attached. Reference numeral 4011 denotes a control file, which specifies the condition that applies the policy, and the key file to be applied according to the condition. A binder file 4012 archives the content files 4002, the key file 4009 or 4010, and the control file 4011 as a single file, according to the embodiment.

Figure 5:
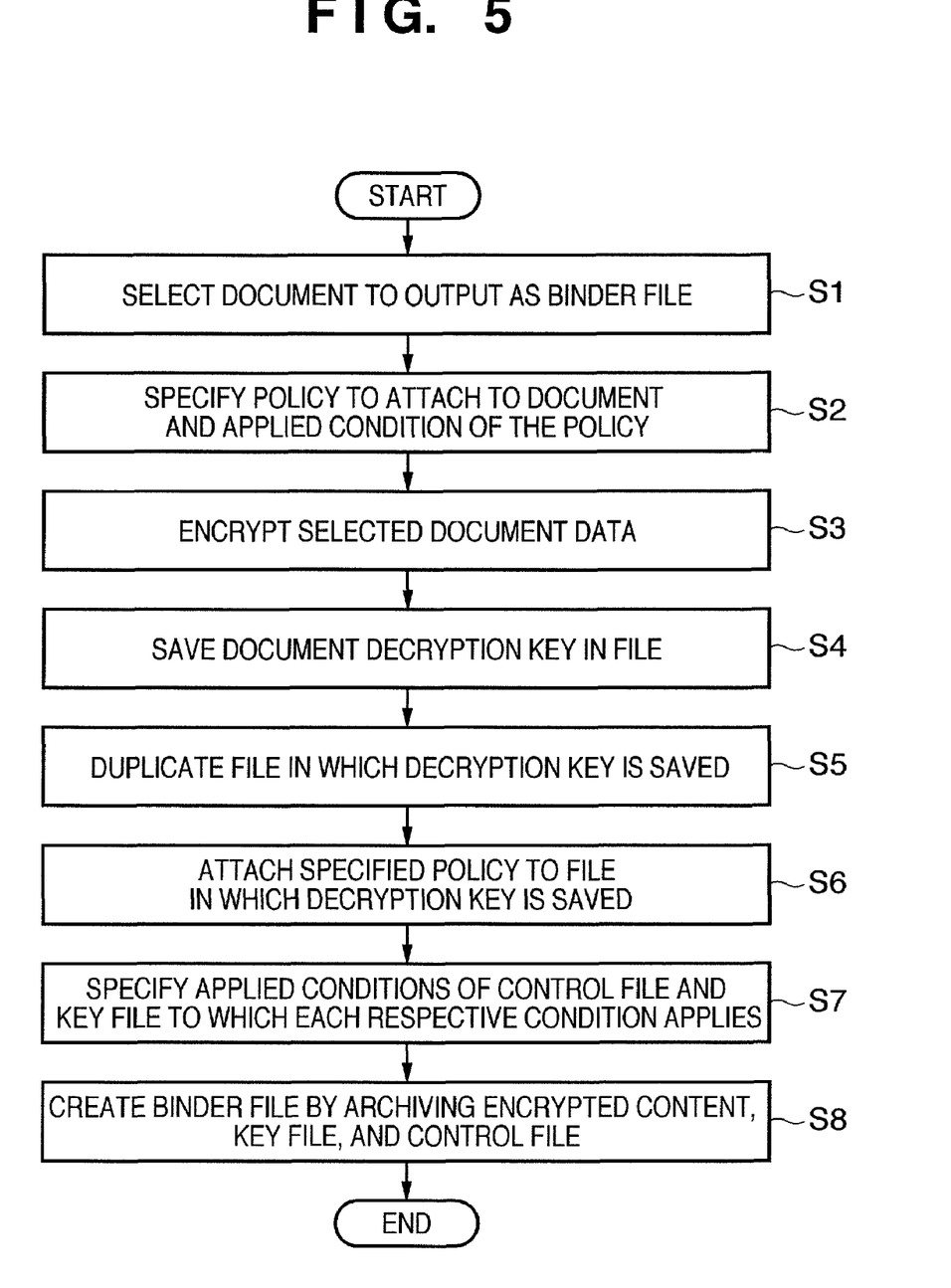
FIG. 5 is a flowchart describing a process flow that converts the document data to a binder and sets the policy in order to distribute the document data, within the document management system, according to the embodiment.

FIG. 5 is a flowchart describing a process flow that converts the document data to a binder and sets the policy in order to distribute the document data, within the document management system, according to the embodiment. The process is presumed to be executed primarily by the client software 1000 that runs on the client, according to the embodiment. Following is a description, with reference to FIG. 4 as a concrete example.

In step S1, a user specifies the document data that is to be outputted as the binder file, i.e., the binder file 401 in FIG. 4. The operation is performed via the user interface section 1001 in the client 1000, according to the embodiment. The operation may be, for example, selecting one or more document data, for example, the content 4000, and clicking a distribute policy button in the user interface section 1001 (not shown), among other possibilities. In step S2, operating authorization that is set to the binder file that is being distributed, and the condition for applying the operating authorization, are specified. In the present circumstance, for example, the condition for applying the operating authorization is specified by displaying a list of the available operating authorization and information that represents the operating authorization or distinguishing characteristics, and having the user check the operating authorization within the list that he wishes to set. Specifying the policy management server that manages the specified operating authorization sends a notification to the specified policy management server of the specified operating authorization. Upon notification, the policy management server 1200 enters the operating authorization in its own policy management database 1205. The policy management server 1200 then returns the PID attached to the operating authorization and the DocumentID that is generated and linked to the PID, or one of these, at a minimum, to the client 1000, which, in turn, links the information returned thereto by the policy management server 1200 to the condition for applying the authorization, saving the information as the policies 4007 and 4008. In the present circumstance, it is possible to specify a plurality of combinations of operating authorizations and conditions for applying the authorization.

In the example shown in FIG. 4, there are two types of combinations of the operating authorizations and the conditions for applying the authorization to the binder file 4012, as per the policies A and B, reference numerals 4007 and 4008. It is permissible for the content of the authorization information that each respective policy specifies to vary. It is also permissible for the policy management server that receives queries regarding the respective policies to be either the same or different servers. In step S3, the document data that was selected in step S1 is encrypted. According to the embodiment, the encryption key 4001 is issued by the encryption key issuance section 1109 of the document server 1100. The encryption key 4001 is sent from the document server 1100, via the communication controller 1101 and the communication controller 1009, to the client 1000, and the file encryption is performed in the encryption processor 1010. The process proceeds to step S4, wherein the decryption key for the encrypted document is saved in the files 4003 and 4004. According to the embodiment, the decryption key that is generated by the encryption key issuance section 1109 of the document server 1100 is saved in the files 4003 and 4004, together with the encryption key. In the present circumstance, if the key issued by the encryption key issuance section 1109 is based on a symmetric, i.e., a private, key cryptography protocol, the encryption key and the decryption key are one and the same, and it would thus be permissible for a single key to be saved in the file. The process proceeds to step S5, wherein the files 4003 and 4004, within which the decryption key is saved, are duplicated according to the condition for applying the authorization of the policy that is set. In step S6, the policies 4007 and 4008 that were acquired in step S2 are attached to the files that store the decryption key. As depicted in FIG. 4, for example, it is presumed that the files are duplicated in two, and the policy A 4007 and the policy B 4008 are specified in step S2. In such a circumstance, the policy A 4007 is attached to the first file 4003, and the policy B 4008 to the second file 4004, to create the two key files 4009 and 4010.

In step S7, the condition specified in the control file 4011 and the key file wherein each respective condition is to be applied are specified and saved. For example, the condition to which the policy A 4007 is applied is the condition of access on the intranet, and it is further presumed that the policy B 4008 is applied to access off the intranet, i.e., on the Internet environment. It is permissible for the adjudication of the condition to describe, for example, a particular domain within the control file 4011, wherein it is determined that the condition is on the intranet if the terminal that accesses the file is a node within the domain, and off the intranet if it is not within the domain. It would also be permissible to describe a range of IP addresses within the control file 4011, wherein it is determined that the condition is on the intranet if the terminal that accesses the file is a node within the range of IP addresses, and off the intranet if it is not within the range of IP addresses. It would also be permissible to determine that the domain that is identical with the network that is connected to either the domain server 1100 or the policy management server 1200 is on the intranet, and off the intranet if it matches another network. In step S8, the encrypted content files 4002, the key files 4009 and 4010, and the control file 4011 are archived, creating the binder file 4012.

Figure 6:
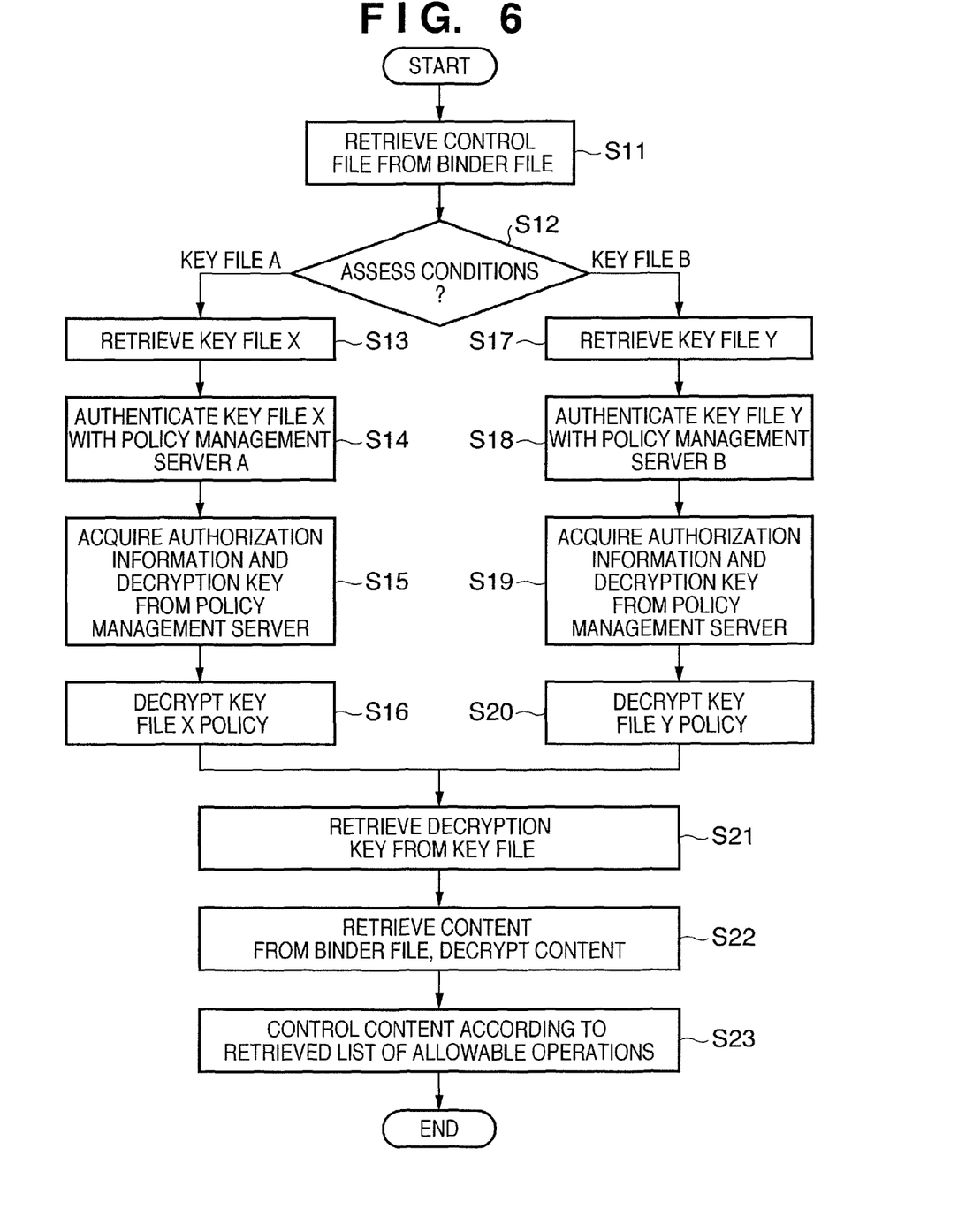
FIG. 6 is a flowchart describing an access authorization check process that is performed when the access is performed on the binder, within the document management system, according to the embodiment.

FIG. 6 is a flowchart that describes an access authorization check process that is performed when the access is performed on the binder file, within the document management system, according to the embodiment. It is presumed that the process is primarily performed by the client software 1000 that runs on the client, according to the embodiment. It is not absolutely necessary for the PC whereon the client software 1000 is installed to be capable of connecting to the document server 1100, according to the embodiment. It would also be permissible for the PC to be either on or off the intranet. It is presumed that the PC is capable of connecting to at least either one of PC policy servers, reference numerals 4005 or 4006 in FIG. 4. Following is a description of the process, again, with reference to FIG. 4.

The execution of the flowchart in FIG. 6 commences when the user who operates the PC whereon the client software is installed performs an operation that accesses the binder file 4012. In step S11, the control file 4011 is retrieved from the binder file 4012. In the present circumstance, a process is performed wherein the file controller 1004 of the client 1000 analyzes the binder file 4012 and retrieves the control file 4011. In step S12, an assessment is made of the applied condition of the policy that is described in the control file 4011. The condition that is described in the control file 4011, which is retrieved in step S11, is checked herein. The applied key file is specified according to the check. Examples of the condition would include whether or not the PC that accesses the binder file 4012 is a node on the intranet.

It is presumed that there are two options according to the embodiment, and that the applicable key file varies depending on the respective conditions. In the present circumstance, steps S13 through S16 are executed if the key file A applies, and steps S17 through S20 if the key file B applies. For example, if the example of the foregoing conditions are applied, the key file A is applied if the PC that accesses the binder file 4012 is an intranet node, and the key file B if not. In steps S13 and S17, either the key file 4009 or 4010, respectively corresponding to either the specified key file A or B, is retrieved. In steps S14 and S18, an authentication process is performed on the policy management server 1200, either reference number 4005 or 4006, corresponding to each respective policy, for the respective retrieved key files 4009 or 4010. In step S15 and step S19, information of the operating authorization that is allowed to the user is acquired together with the key that decrypts the encrypted key file, according to the policy that is managed by the policy management server, if the policy management server is successfully authenticated. In step S16 and S20, the key that is acquired in either step S15 or step S19 is used to decrypt either the key file 4009 or 4010, respectively.

Execution of either step S16 or step S20 brings the process to step S21, wherein the content decryption key 4001 is retrieved from the decrypted key file. The process proceeds to step S22, wherein the content file 4002 is retrieved from the binder file 4012, and decrypted using the decryption key 4001 that is retrieved in step S21. The process proceeds to step S23, wherein the access authorization vis-à-vis the content in the binder file 4012 is controlled according to the operation authorization information that is acquired in either step S15 or step S19. The result is reflected in the user interface section 1001.

It is thus possible to change the authorization information that is acquired from the policy management server 1200, according to the condition that is described in the control file 4011, allowing suitable changes to the operation authorization vis-à-vis the binder file 4012.

Figure 7:
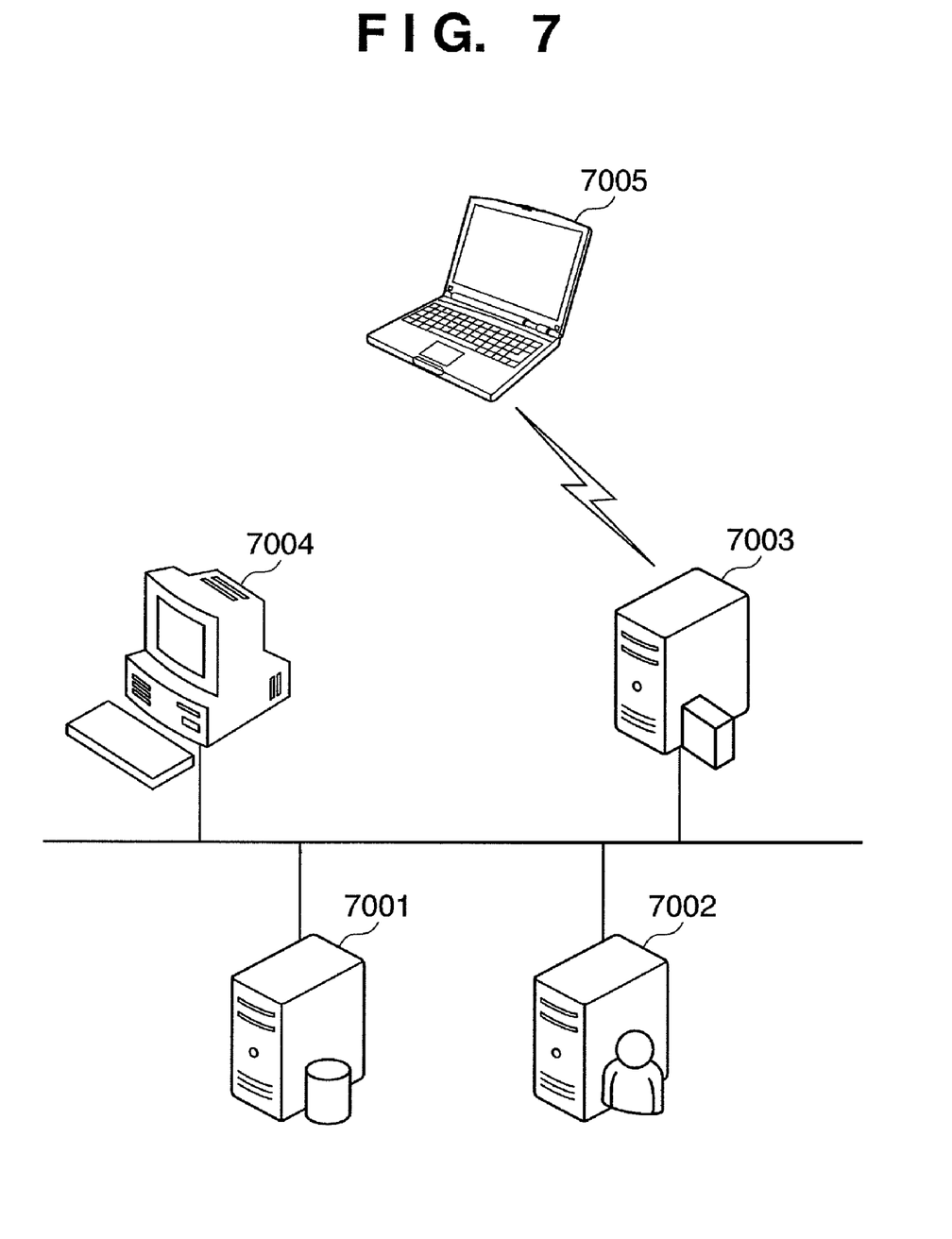
FIG. 7 depicts a view illustrating a concrete example of the document management system according to the first embodiment of the present invention.

FIG. 7 depicts a view illustrating a concrete example of the document management system in FIG. 1, according to the first embodiment of the present invention.

A document server 7001 is the server whereupon the document server software 1100 depicted in FIG. 1 is installed, and receives access from within the intranet, according to the embodiment. A local policy management server 7002 is the server whereupon the policy management server 1200 depicted in FIG. 1 is installed. According to the first embodiment, a local access is received from the intranet, and an authentication process or a policy verification is performed, by the local policy management server 7002. A Web policy management server 7003 performs the authentication process or the policy verification in accordance with the policy, similar to that performed by the local policy management server 7002. In the present circumstance, the Web policy management server 7003 is set up as an Internet Web server that is capable of access within as well as without the intranet. A client 7004 is a client machine that is used within the intranet, whereupon the client software 1000 depicted in FIG. 1 is installed. The client software 1000 depicted in FIG. 1 is also installed on a mobile client 7005, as with the client 7004. The mobile client 7005 is capable of accessing the policy management server 7003 over the Internet, instead of having a direct connection to the intranet.

Describing the control file allows changing the authorization such as follows, for example, according to the first embodiment. If, for example, the environment allows local policy management server 7002 access and authentication, such as per the client 7004, it is possible to control access to the binder file, according to the policy A. If, on the other hand, the environment precludes access to the local policy management server 7002, while allowing Web policy management server 7003 access and authentication, such as per the client 7005, it is possible to control access to the binder file, according to the policy B. For example, the policy A allows editing and high-resolution printing, while the policy B may only allow viewing without editing, and low-resolution printing. Thus, it is possible to allow editing and high-resolution printing on the distributed file in the intranet environment. It is also possible implement control to permit only limited operation on the file, for example, viewing or low-resolution printing, if the file is moved off the intranet, whether to a laptop PC, sent by e-mail, or other form.

According to the first embodiment, it is possible to apply and execute policies for control of authorization to access distributed files that vary in response to the applied conditions of the policy.

Second Embodiment

The preceding is a description of a structure that envisions a client-server model, in the first embodiment. It would be permissible, however, to have a configuration that embeds the processing mechanism of the client 7001 into a Web server 8001, in FIG. 8, allowing access via a browser, according to the first embodiment.

Figure 8:
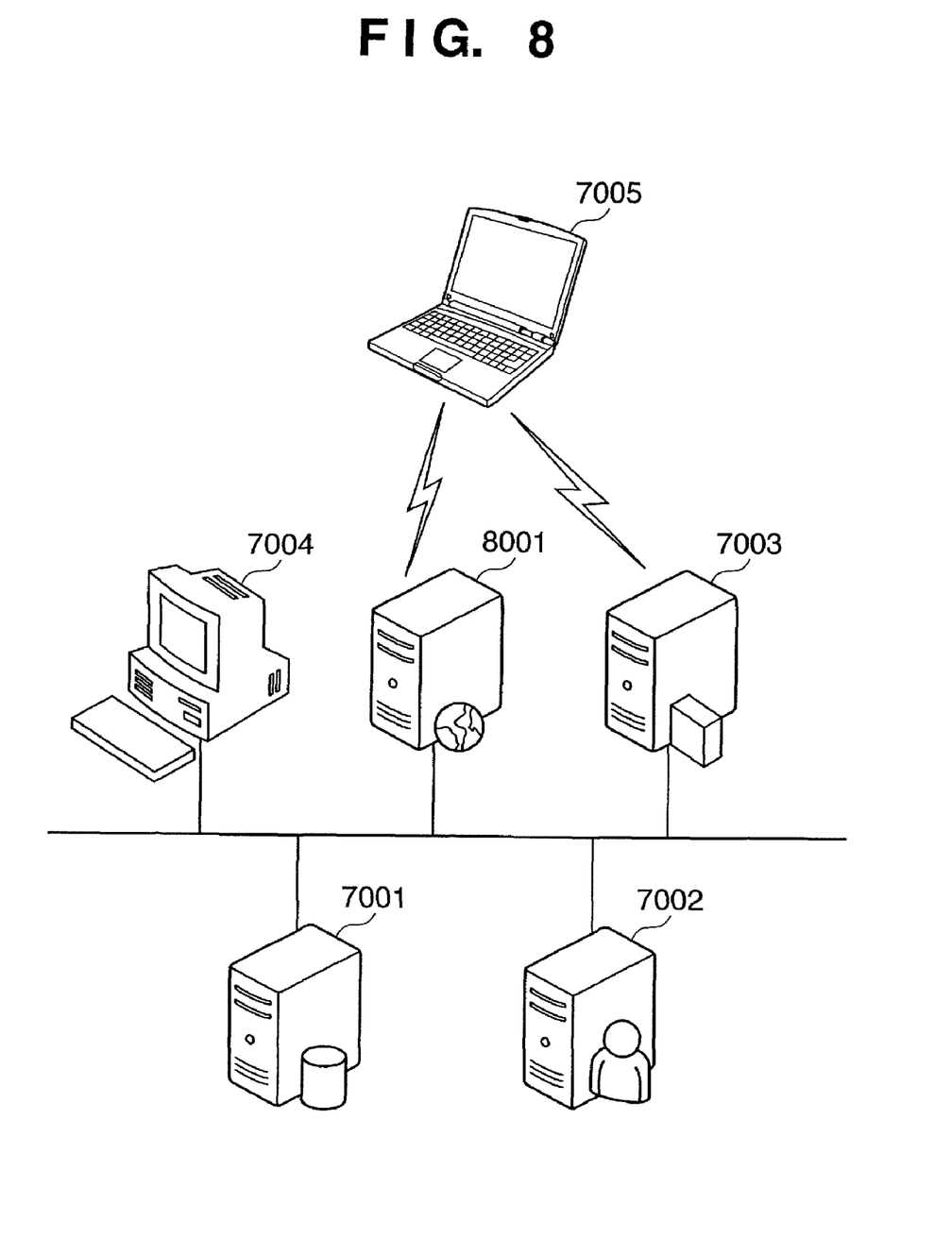
FIG. 8 depicts a view illustrating a configuration of the document management system according to a second embodiment.

FIG. 8 depicts a view illustrating a configuration of the document management system according to a second embodiment of the present invention. Elements that are similar to those in FIG. 7 are denoted with identical reference numerals.

The functions of the client software 1000 are embedded in the Web server 8001. In such a circumstance, the user interface 1001 in FIG. 1 serves as the interface of the Web server 8001, which carries out the task of converting a request received over the intranet or the Internet into a command aimed at a lower level component. The client 7004 and the mobile client 7005 use the Web browser to access the Web server 8001, according to the second embodiment.

Thus, it is possible to apply and execute policies for control of authorization to access distributed files that vary in response to the applied conditions of the policies, without installing separate client software for each respective client, according to the second embodiment.

Third Embodiment

The client 1000 verifies the policy data that is attached to the control file 4011 by sending the data to the policy management server 1200, in the first and second embodiments. The policy data processor 1008 processes the usable authorization list or other data received from the policy management server 1200, and returns the results of the policy verification or other data to the document management controller 1006. The policy data processor 1008 lives in either the client 1000, as per FIG. 1, or the Web server 8001, as described in FIG. 8. It would be permissible, however, to separate the policy data processor 1008 into a different server, a policy data processing server 9000 that is connected over a network, as depicted in FIG. 9.

Figure 9:
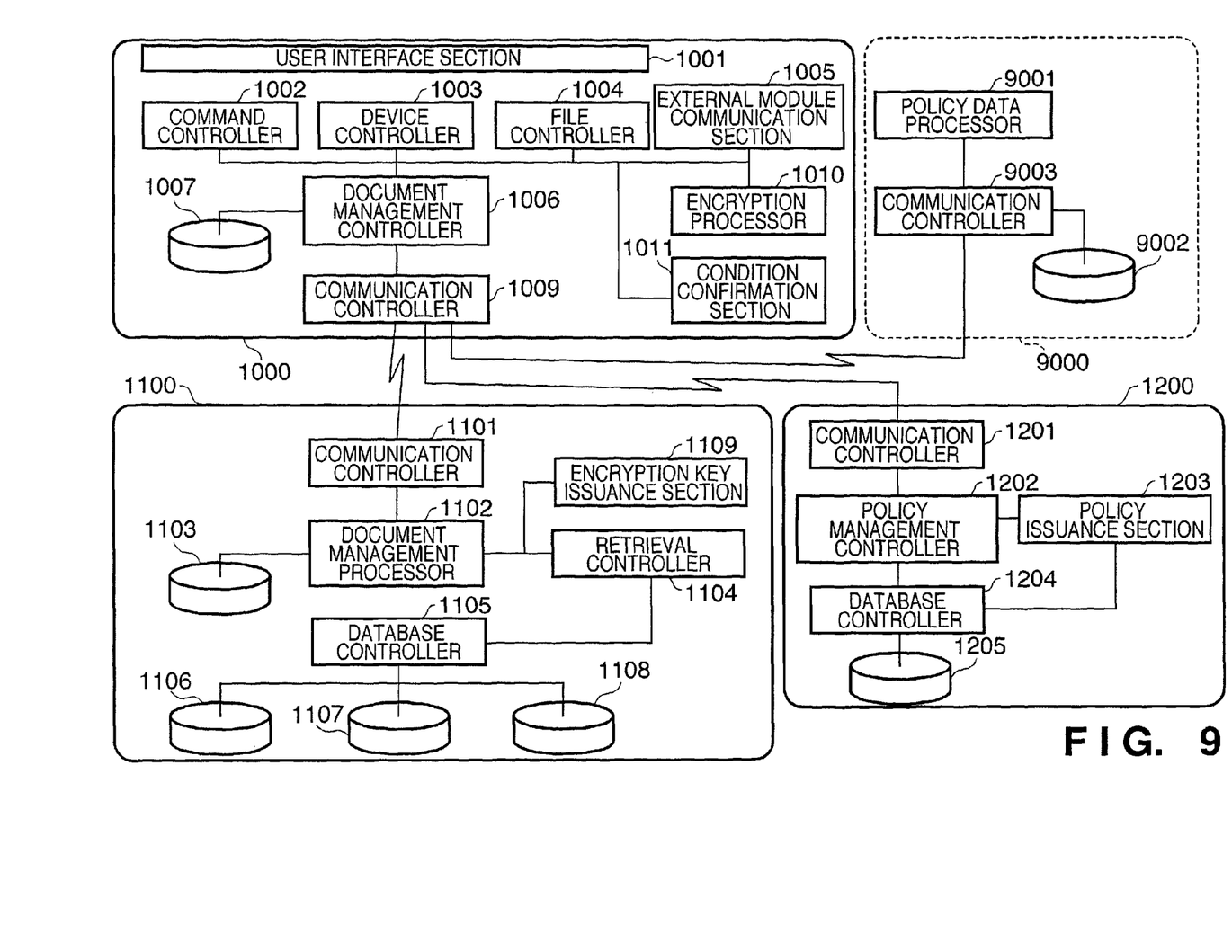
FIG. 9 is a block diagram describing a configuration of the document management system according to a third embodiment of the present invention.

FIG. 9 is a block diagram describing a configuration of the document management system according to a third embodiment of the present invention. Elements that are similar to those in FIG. 1 are denoted with identical reference numerals, and descriptions thereof omitted.

The policy data processing server 9000 possesses a policy data processor 9001, a temporary database 9002, and a communication controller 9003. The policy data processor 9001 sends the policy data that is attached to the control file 4011 to the policy management server 1200, and performs the process of verifying the policy, similar to the policy data processor 1008 in FIG. 1. The policy data processor 9001 processes the usable authorization list or other data received from the policy management server 1200, and returns the results of the policy verification or other data to the client 1000 or the Web server 8001, via the communication controller 9003.

The temporary database 9002 stores temporary data. The communication controller 9003 performs control of communication with the communication controller 1009 of the client 1000. The communication controller 1201 of the policy management server 1200, however, is capable of performing parallel communication with a plurality of client communication controllers.

Setting up the policy data processor 1008 in FIG. 1 in an external policy management server allows replacing the policy management server 1200 and the policy data server 9000 with other models of servers from other manufacturers, according to the third embodiment.

In many instances, a module program that bears the burden of the policy data processor 9001 is provided by the developer of the policy management server 1200, and thus, cannot usually be changed by the end user. Placing the module program in a different policy management server allows selection of the operating system that is used as the client or the Web server, without restriction according to the runtime environment of the policy data processor 9001. Having the policy management server be a separate server allows reducing the load on the client machine or the Web server as well.

Fourth Embodiment

In the above mentioned embodiments, a plurality of the policy management servers 7002 and 7003 are provided, with the policies from each respective policy management server stored in a single file. It would be permissible, however, to set a single file to a plurality of policies that a single policy management server operates.

According to a fourth embodiment, it is possible to implement control of access authorization of distributed files, without setting a plurality of policy management servers, by applying a different policy to each respective applied condition of the policy.

Fifth Embodiment

In the above-described embodiments, the applied condition of the policy is detected on a location basis, i.e., whether or not the environment is on the intranet, or on the Internet environment, as the condition that is described in the control file 4011, and the policy to be used is switched accordingly. It would also be permissible to switch the policy by detecting a temporal condition to access a file, for example, such as a seasonal or calendar date, a time of day, or a time interval.

According to a fifth embodiment, it is possible to implement control of access authorization of distributed files based on temporal conditions, by applying a different policy to each respective condition.

Sixth Embodiment

In the above mentioned embodiments, the applied condition of the policy is detected on either a location or a temporal basis, as the condition that is described in the control file 4011, and the policy to be used is switched accordingly. It would be, however, permissible to switch the policy by detecting a condition of a type of device that uses the file, such as a PC, a mobile computing device, a cellular phone, a multifunction peripheral (MFP), a printer, or a fax.

According to a sixth embodiment, it is possible to implement control of access authorization of distributed files based on a condition of the type of device that uses the file, by applying a different policy to each respective condition.

Seventh Embodiment

In the above mentioned embodiments, detection of the applied condition of the policy is performed on a location basis, a temporal basis, or on a basis of the type of device that uses the file, as the condition that is described in the control file 4011, and the policy to be used is switched accordingly. However, it would also be permissible to switch the policy by performing a condition detection of the status of the device, such as whether or not the device in use is active, operating normally, in standby mode, in execute mode, in shutdown mode, or experiencing a fault or breakdown.

According to the seventh embodiment, it is possible to implement control of access authorization of distributed files based on a condition of the status of the device that uses the file, by applying a different policy to each respective condition.

Eighth Embodiment

In the above described embodiments, the applied condition of the policy is detected on a location basis, a temporal basis, a basis of the type or status of the device that uses the file, or a condition that is a mixture thereof, as the condition that is described in the control file 4011, and the policy to be used is switched accordingly. However, it would also be permissible to record the number of times that the control file, the key file, or the policy management server, is used, and switch the applied policy in response to a specified number of instances of an operation being performed, such as the number of times a file is opened, displayed, or printed. It would be possible, for example, to enter the number of uses on a per control file basis, and change the policy based on the number of accesses on a per binder file basis.

It would be possible to record the number of times a policy is used for each respective key file, and change the policy in response to the number of times that each policy is applied. It would be possible to perform a control that, for example, applies a policy to prevent a file from being opened if the file is accessed more than a given number of times.

It would also be possible to manage, in a consolidated manner, such numbers as the total number of times a file and any copies that are made thereof are opened or printed, by recording the number of uses on the policy management server, even if a plurality of copies are made of the file. Control may thus be performed in response to such numbers.

According to the eighth embodiment, it is possible to implement control of access authorization of distributed files based on a condition of the number of times that the file is used, by applying a different policy to each respective condition.

Additional Embodiments

The present invention may be achieved by supplying a software program that implements the functions of the embodiments to the system or the apparatus, either directly or remotely, and having a computer of the system or the apparatus read and execute the program. In such a circumstance, the software need not take the form of a program, provided that the software possesses the function of the program.

Accordingly, the program code that is itself installed on the computer to implement the function processing of the present invention also implements the present invention. The scope of the claims according to the present invention also include the computer program that is installed on the computer to implement the function processing of the present invention. In such a circumstance, the form that the program takes may be such as object code, a program that is interpreted and executed, or a script that is supplied to the operating system, provided that the software possesses the function of the program.

A variety of recording media may be used to supply the program, including such as a floppy disk, a hard drive, an optical disc, a magneto-optical (MO) disk, a CD-ROM, a CD-R, a CD-RW, magnetic tape, a non-volatile memory card, ROM, or a DVD, including DVD-ROM or DVD-R.

Another method of supplying the program would involve using a browser on a client computer to connect to a website on the Internet, and downloading the program from the website to a hard drive or other storage medium. In such a circumstance, it is permissible for the software that is downloaded to be a compressed file with an auto-install function. The supply of the program may also be implemented by partitioning the source code that configures the program of the present invention into a plurality of files, and downloading each file from a different webpage. A web server that downloads the program file that implements the function processing of the present invention to a plurality of users is also included within the scope of the claims.

It is also permissible to distribute the program of the present invention to the users in an encrypted format, on a CD-ROM or other storage medium. In such a circumstance, a key file that decrypts the encrypted file if downloaded from a website on the Internet to users who satisfy prescribed conditions, and using the key file causes the encrypted program to be installed on the computer in an executable format.

The program may also be implemented in a form other than the form wherein the functions of the embodiments are implemented by having a computer read and execute the program. For example, it is permissible for the operating system or other software running on the computer to implement the functions of the embodiments by actually performing the processes itself, in whole or in part, in accordance with the program instructions.

It would also be permissible for the program that is read out from the storage medium to be written to a memory module that is included in an expansion board that is inserted into the computer, or an expansion unit that is connected to the computer. In such a circumstance, a CPU or other module that is included in the expansion board or the expansion unit implements the functions of the embodiments by actually performing the processes itself, in whole or in part, in accordance with the program instructions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-196276, filed Jul. 18, 2006, which is hereby incorporated by reference herein in its entirety.

What is claimed is:

1. A document management apparatus configured to be connected, over a network, to a first policy management server and second policy management server for respectively managing an operation authorization of a document, comprising:

an acquisition unit configured to respectively acquire a first ID for specifying a first operation authorization of a document managed by the first policy management server from the first policy management server and a second ID for specifying a second operation authorization of the document managed by the second policy management server from the second policy management server;

an encryption unit configured to encrypt a document;

a key data creation unit configured to create first key data, which contains a decryption key adapted to decrypting the document encrypted by the encryption unit and the first ID acquired by the acquisition unit, and to create second key data, which contains a decryption key adapted to decrypt the document encrypted by the encryption unit and the second ID acquired by the acquisition unit; and a unit configured to generate binder file data that contains the document encrypted by the encryption unit, the first key data and the second key data respectively created by the key data creation unit, and control data for describing an applied condition of the first and second key data.

2. The apparatus according to claim 1, wherein:

the control data contained in the binder file data contains a description of an applied condition that applies key data specified among the first key data and the second key data;

further comprising:

a selection unit configured to select one of key data among the first and second key data based on the applied condition described in the control data contained in the binder file data; and a notification unit configured to notify the policy management server of the ID contained in the key data selected by the selection unit;

a reception unit configured to receive operation authorization information from the first or second policy management server corresponding to the selected one of key data in response to the ID notified by the notification unit;

a decryption unit configured to decrypt the document encrypted by the encryption unit, in accordance with the decryption key contained in the key data selected by the selection unit; and a control unit configured to control the document decrypted by the decryption unit, in accordance with the operation authorization information received by the reception unit.

3. The apparatus according to claim 2, wherein the decryption key for decrypting the document, that is contained in the first key data, is in advance encrypted using a first encryption key issued by the first policy management server, and the decryption key for decrypting the document, that is contained in the second key data, is in advance encrypted using a second encryption key issued by the second policy management server; and the reception unit receives a first decryption key from the first policy management server or a second decryption key from the second policy management server to decrypt the encrypted decryption key;

further comprising:

a decryption key decryption unit configured to decrypt the encrypted decryption key using the first or second decryption key received by the reception unit.

* * * * *